United States Patent
Usuda et al.

(10) Patent No.: US 7,907,914 B2
(45) Date of Patent: Mar. 15, 2011

(54) TRANSMISSION RATE CONTROL METHOD AND RADIO BASE STATION

(75) Inventors: Masafumi Usuda, Tokyo (JP); Anil Umesh, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 511 days.

(21) Appl. No.: 11/912,529

(22) PCT Filed: Apr. 28, 2006

(86) PCT No.: PCT/JP2006/309015
§ 371 (c)(1),
(2), (4) Date: Feb. 13, 2008

(87) PCT Pub. No.: WO2006/118263
PCT Pub. Date: Nov. 9, 2006

(65) Prior Publication Data
US 2008/0171566 A1    Jul. 17, 2008

(30) Foreign Application Priority Data
Apr. 28, 2005 (JP) ................................ 2005-133758

(51) Int. Cl.
*H04B 7/005* (2006.01)
(52) U.S. Cl. ...... 455/69; 455/517; 455/452.2; 455/422.1
(58) Field of Classification Search .................. 455/522, 455/69, 517, 453, 422.1, 68, 452.1, 452.2, 455/446, 67.13, 200.1; 370/335, 342, 235, 370/329, 332
See application file for complete search history.

(56) References Cited

U.S. PATENT DOCUMENTS
7,215,653 B2 * 5/2007 Kim et al. .................... 370/329
2004/0102177 A1 * 5/2004 Otsuka ......................... 455/403
2004/0218533 A1 * 11/2004 Kim et al. .................... 370/235

FOREIGN PATENT DOCUMENTS
EP    1 377 097 A1    1/2004
JP    2006-140844    6/2006
JP    2006-140845    6/2006

OTHER PUBLICATIONS
Search Report issued on Jul. 30, 2008 in the counterpart European application.

(Continued)

*Primary Examiner* — John Lee
(74) *Attorney, Agent, or Firm* — Marvin A. Motsenbocker; Mots Law, PLLC

(57) ABSTRACT

To prevent consecutive transmission of a relative transmission rate control channel (RGCH) including a "Down" command and minimize deterioration in the service quality due to "Down" commands from non-serving cells, a transmission rate control method controls, at a mobile station, a transmission rate of uplink user data by using a first relative transmission rate control channel received from a serving cell and a second relative transmission rate control channel received from a non-serving cell. In the transmission rate control method, a maximum frequency of transmitting the second relative transmission rate control channel which includes a down command for instructing to decrease the transmission rate of the uplink user data is a value fixed in a mobile communication system or a value notified by a radio network controller.

3 Claims, 6 Drawing Sheets

OTHER PUBLICATIONS

NTT DOCOMO: "Control over serving vs. non-serving E-DCH resource allocation" TSG-RAN Working Group 2 #46BIS Meeting, [Online] Apr. 4, 2005, p. 1-3, XP002486866.

3GPP TS 25.309 V6.2.0 (Mar. 2005), Technical Specification, 3rd Generation Partnership Project; Technical Specification Group Radio Access Network, FDD Enhanced Uplink; Overall description; Stage 2 (Release 6), p. 1-30.

TSG-RAN Working Group 2 #46bis meeting R2-050907, "Control over serving vs. non-serving E-DCH resource allocation 11.2 (Open item 1.3)", NTT DoCoMo, Beijing China, Apr. 4-8, 2005, p. 1-3.

* cited by examiner

TRANSMISSION RATE CONTROL METHOD AND RADIO BASE STATION

TECHNICAL FIELD

The present invention relates to a transmission rate control method and a mobile station for controlling a transmission rate in an uplink.

BACKGROUND ART

In a conventional mobile communication system, in an uplink from a mobile station UE to a radio base station Node B, a radio network controller RNC is configured to determine a transmission rate of a dedicated channel, in consideration of radio resources of the radio base station Node B, an interference volume in an uplink, a transmission power of the mobile station UE, transmission processing performance of the mobile station UE, a transmission rate required for an upper application, and the like, and to notify the determined transmission rate of the dedicated channel by a message in a layer-3 (Radio Resource Control Layer) to both of the mobile station UE and the radio base station Node B.

Here, the radio network controller RNC is provided at an upper level of the radio base station Node B, and is an apparatus configured to control the radio base station Node B and the mobile station UE.

In general, data communications often cause burst traffic compared with voice communications or TV communications. Therefore, it is preferable that a transmission rate of a channel used for the data communications is changed fast.

However, as shown in FIG. 10, the radio network controller RNC integrally controls a plurality of radio base stations Node B in general. Therefore, in the conventional mobile communication system, there has been a problem that it is difficult to perform fast control for changing of the transmission rate of the channel (for example, per approximately 1 through 100 ms), due to processing load, processing delay, or the like.

In addition, in the conventional mobile communication system, there has also been a problem that costs for implementing an apparatus and for operating a network are substantially increased even if the fast control for changing of the transmission rate of the channel can be performed.

Therefore, in the conventional mobile communication system, control for changing of the transmission rate of the channel is generally performed on the order from a few hundred ms to a few seconds.

Accordingly, in the conventional mobile communication system, when burst data transmission is performed as shown in FIG. 11(a), the data are transmitted by accepting low-speed, high-delay, and low-transmission efficiency as shown in FIG. 11(b), or, as shown in FIG. 11(c), by reserving radio resources for high-speed communications to accept that radio bandwidth resources in an unoccupied state and hardware resources in the radio base station Node B are wasted.

It should be noted that both of the above-described radio bandwidth resources and hardware resources are applied to the vertical radio resources in FIG. 11.

Therefore, the 3rd Generation Partnership Project (3GPP) and the 3rd Generation Partnership Project 2 (3GPP2), which are international standardization organizations of the third generation mobile communication system, have discussed a method for controlling radio resources at high speed in a layer-1 and a media access control (MAC) sub-layer (a layer-2) between the radio base station Node B and the mobile station UE, so as to utilize the radio resources effectively. Such discussions or discussed functions will be hereinafter referred to as "Enhanced Uplink (EUL)".

As shown in FIG. 12, in the Enhanced Uplink, the mobile station UE is configured to give the highest priority to a "Down" command, when a relative transmission rate control channel (RGCH: Relative rate Grant Channel) received from a non-serving cell includes a "Down" command even while a relative transmission rate control channel (RGCH) received from a serving cell includes an "Up" command (refer to Non-patent Document 1).

Here, the non-serving cell is configured to determine, based on the state of the interference power in the non-serving cell, whether or not to transmit a relative transmission rate control channel (RGCH) including a "Down" command (refer to Non-patent Document 2).

However, in a conventional transmission rate control method, a relative transmission rate control channel (RGCH) including a "Down" command can be transmitted in consecutive time intervals, and thereby, QoS expected by the serving cell cannot be satisfied. This leads to a problem that service quality may be deteriorated.

Non-patent Document 1: 3GPP TSG-RAN TS25.309 v6.2.0
Non-patent Document 2: 3GPP TSG-RAN R2-05907

DISCLOSURE OF THE INVENTION

Hence, The present invention has been made in view of the above problems, and its object is to provide a transmission rate control method and a mobile station that make it possible to minimize deterioration in the service quality, due to "Down" commands from non-serving cells. This can be achieved by preventing consecutive transmission of a relative transmission rate control channel (RGCH) including a "Down" command, and thereby, by creating a time interval for allowing the "Up" command included in the relative transmission rate control channel (RGCH) transmitted from the serving cell to be effective.

A first aspect of the present invention is summarized as a transmission rate control method comprising: controlling, at a mobile station, a transmission rate of uplink user data by using a first relative transmission rate control channel received from a serving cell and a second relative transmission rate control channel received from a non-serving cell, wherein a maximum frequency of transmitting the second relative transmission rate control channel which includes a down command for instructing to decrease the transmission rate of the uplink user data is a value fixed in a mobile communication system.

A second aspect of the present invention is summarized as a transmission rate control method comprising: controlling, at a mobile station, a transmission rate of uplink user data by using a first relative transmission rate control channel received from a serving cell and a second relative transmission rate control channel received from a non-serving cell, wherein a maximum frequency of transmitting the second relative transmission rate control channel which includes a down command for instructing to decrease the transmission rate of the uplink user data is a value notified by a radio network controller.

A third aspect of the present invention is summarized as a radio base station configured to transmit a first relative transmission rate control channel for controlling a transmission rate of uplink user data of a serving mobile station, and to transmit a second relative transmission rate control channel for controlling a transmission rate of uplink user data of a non-serving mobile station, wherein a maximum frequency of transmitting the second relative transmission rate control channel which includes a down command for instructing to decrease the transmission rate of the uplink user data of the non-serving mobile station is set in the radio base station.

BEST MODE FOR CARRYING OUT THE INVENTION (Mobile Communication System According to a First Embodiment of the Present Invention)

A description will be given of a configuration of a mobile communication system according to a first embodiment of the present invention with reference to FIGS. 1 to 8.

Figure 10:
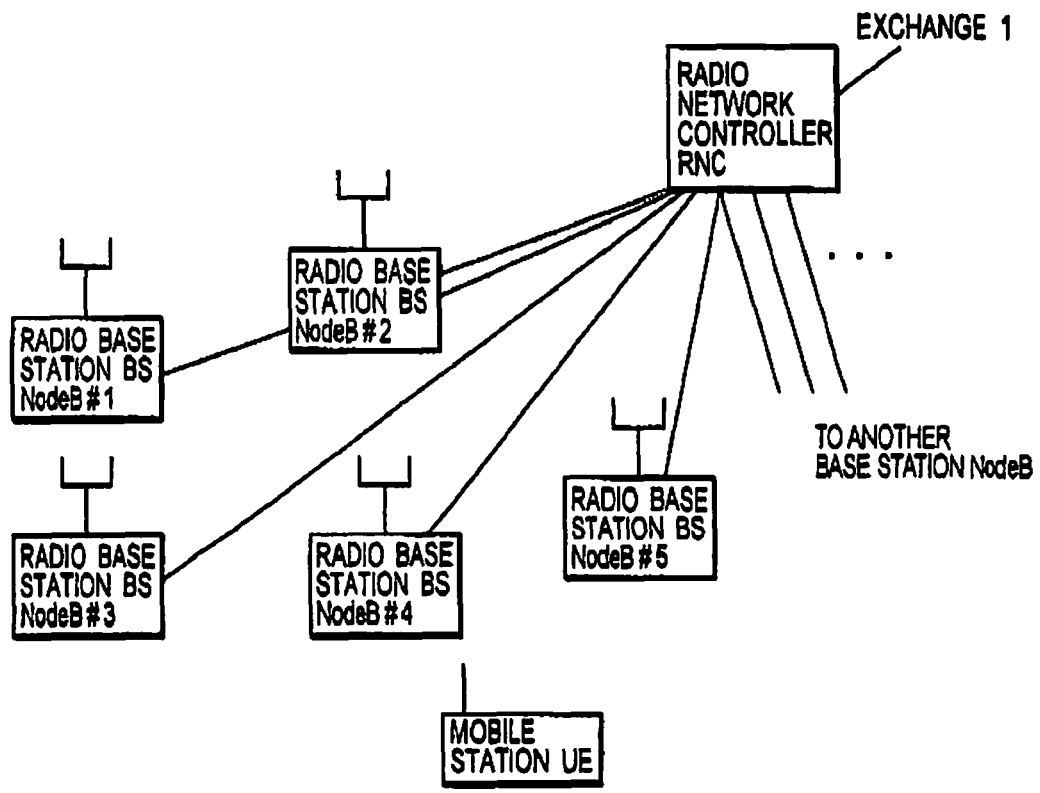
FIG. 10 is a diagram showing an entire configuration of a general mobile communication system.
Figure 11:
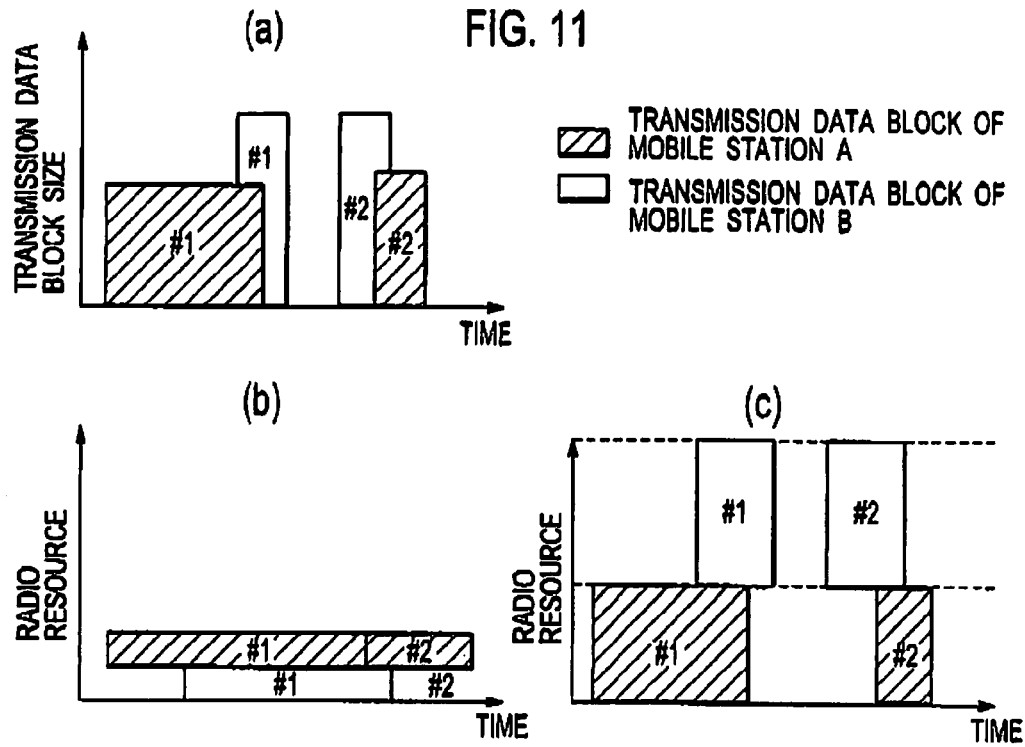
FIGS. 11(*a*) to 11(*c*) are graphs illustrating operations at the time of burst data transmission in a conventional mobile communication system.
Figure 12:
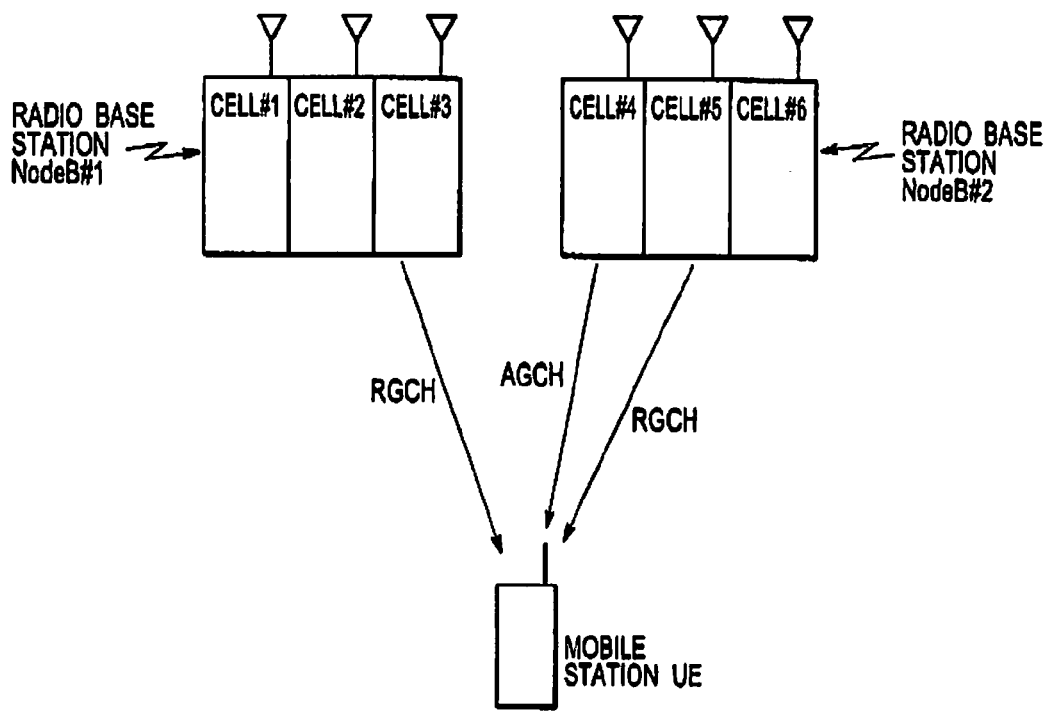
FIG. 12 is a diagram for showing transmission rate control channels transmitted in a conventional mobile communication system.

It should be noted that, as shown in FIG. 10, the mobile communication system according to this embodiment is provided with a plurality of radio base stations Node B #1 to Node B #5 and a radio network controller RNC.

In addition, in the mobile communication system according to this embodiment, a "High Speed Downlink Packet Access (HSDPA)" is used in a downlink, and an "Enhanced Uplink (EUL)" is used in an uplink. It should be noted that in both of the HSDPA and the EUL, retransmission control (N process stop and wait) shall be performed by a "Hybrid Automatic Repeat Request (HARQ)".

Therefore, an Enhanced Dedicated Physical Channel (E-DPCH), configured of an Enhanced Dedicated Physical Data Channel (E-DPDCH) and an Enhanced Dedicated Physical Control Channel (E-DPCCH), and a Dedicated Physical channel (DPCH), configured of a Dedicated Physical Data Channel (DPDCH) and a Dedicated Physical Control Channel (DPCCH), are used in the uplink.

Here, the E-DPCCH transmits the EUL control data such as a transmission format number for defining a transmission format (transmission block size, or the like) of the E-DPDCH, HARQ related information (a number of retransmissions, or the like), and scheduling related information (transmission power, buffer residence-volume, or the like in the mobile station UE).

In addition, the E-DPDCH is paired with the E-DPCCH, and transmits user data for the mobile station UE based on the EUL control data transmitted through the E-DPCCH.

The DPCCH transmits control data such as a pilot symbol used for RAKE combining, SIR measurement, or the like, a Transport Format Combination Indicator (TFCI) for identifying a transmission format of uplink DPDCH, and a transmission power control bit in a downlink.

In addition, the DPDCH is paired with the DPCCH, and transmits user data for the mobile station UE based on the control data transmitted through the DPCCH. However, if user data to be transmitted does not exist in the mobile station UE, the DPDCH can be configured not to be transmitted.

In addition, in the uplink, a High Speed Dedicated Physical Control Channel (HS-DPCCH) and a random access channel (RACH), which are required when the HSPDA is applied, are also used. The HS-DPCCH transmits a Channel Quality Indicator (CQI) in the downlink, and a transmission acknowledgement signal (Ack or Nack) for a high speed dedicated physical data channel.

Figure 1:
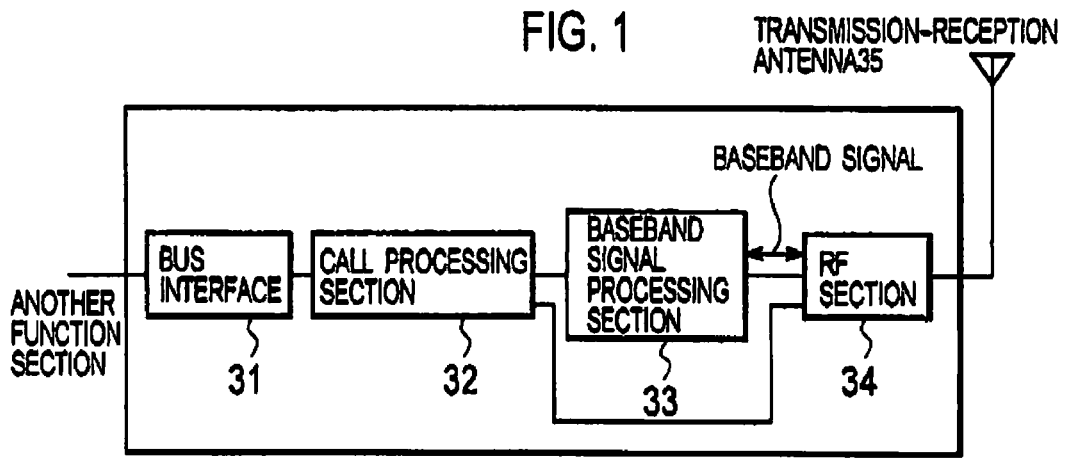
FIG. 1 is a functional block diagram of a mobile station of a mobile communication system according to the first embodiment of the present invention.

As shown in FIG. 1, the mobile station UE according to this embodiment is provided with a bus interface 31, a call processing section 32, a baseband processing section 33, a radio frequency (RF) section 34, and a transmission-reception antenna 35.

However, these functions can be independently present as a hardware, and can be partly or entirely integrated, or can be configured through a process of software.

The bus interface 31 is configured to forward user data output from the call processing section 32 to another functional section (for example, an application related functional section). In addition, the bus interface 31 is configured to forward user data transmitted from another functional section (for example, the application related functional section) to the call processing section 32.

The call processing section 32 is configured to perform a call control processing for transmitting and receiving user data.

The baseband signal processing section 33 is configured to acquire user data by performing a layer-1 processing including a despreading processing, a RAKE combining processing, and a Forward Error Correction (FEC) decode processing, a Media Access Control (MAC) processing including a MAC-e processing and a MAC-d processing, and a Radio Link Control (RLC) processing against the baseband signals transmitted from the RF section 34, so as to transmit the acquired user data to the call processing section 32.

In addition, the baseband signal processing section 33 is configured to generate baseband signals by performing an RLC processing, a MAC processing, or a layer-1 processing against the user data transmitted from the call processing section 32, so as to transmit the baseband signals to the RF section 34.

Detailed description of the functions of the baseband signal processing section 33 will be given later.

The RF section 34 is configured to generate baseband signals by performing the detection processing, the filtering processing, the quantization processing, or the like against radio frequency signals received through the transmission-reception antenna 35, so as to transmit the generated baseband signals to the baseband signal processing section 33.

In addition, the RF section 34 is configured to convert the baseband signals transmitted from the baseband signal processing section 33 to the radio frequency signals.

Figure 2:
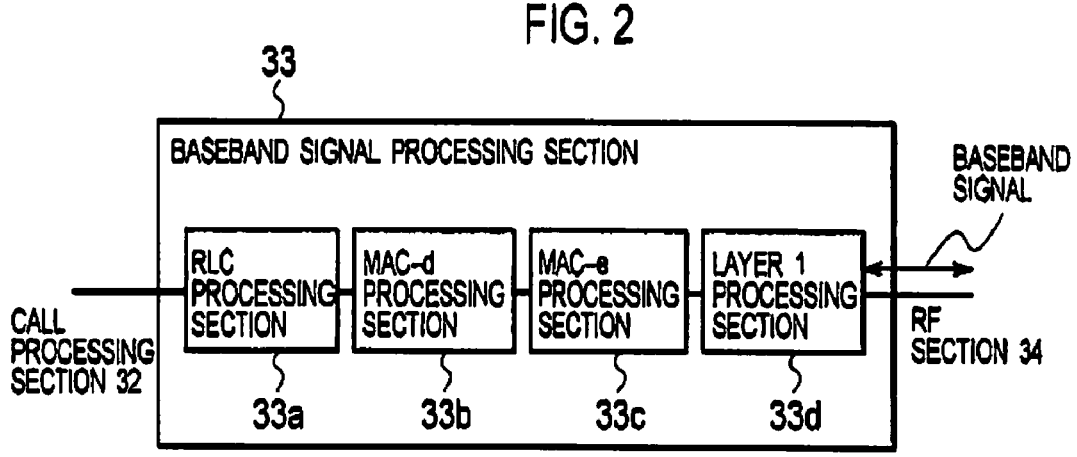
FIG. 2 is a functional block diagram of a baseband signal processing section in a mobile station of the mobile communication system according to the first embodiment of the present invention.

As shown in FIG. 2, the baseband signal processing section 33 is provided with an RLC processing section 33a, a MAC-d processing section 33b, a MAC-e processing section 33c, and a layer-1 processing section 33d.

The RLC processing section 33a is configured to perform a processing (RLC processing) of an upper layer of a layer-2 against user data transmitted from the call processing section 32 so as to transmit the user data to the MAC-d processing section 33b.

The MAC-d processing section 33b is configured to grant a channel identifier header based on a logical channel to which data is originated, so as to generate a transmission format in the uplink.

Figure 3:
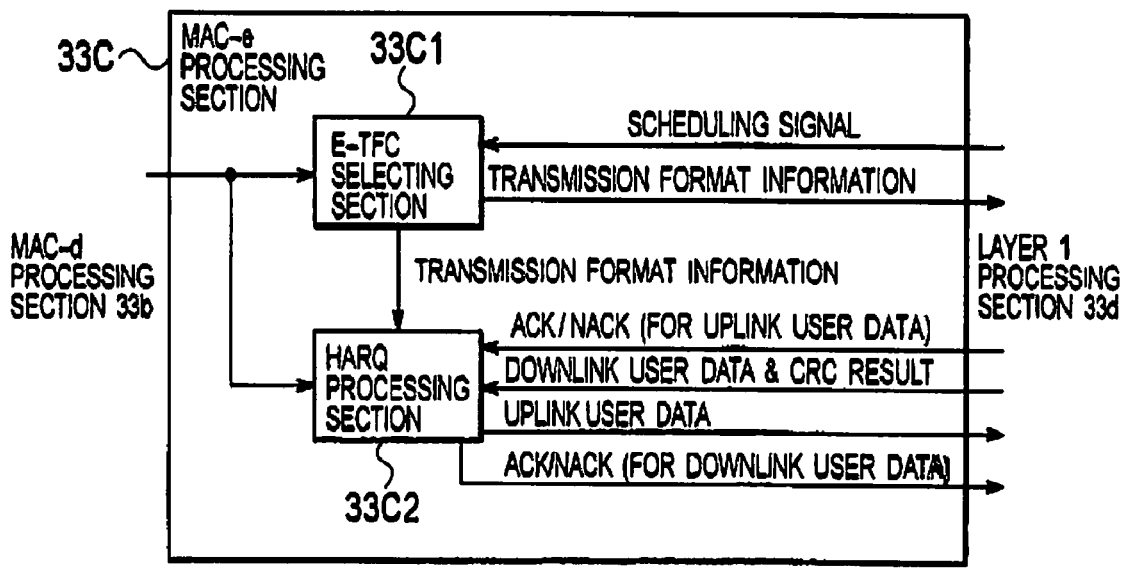
FIG. 3 is a functional block diagram of a MAC-e processing section of the baseband signal processing section in a mobile station of the mobile communication system according to the first embodiment of the present invention.

As shown in FIG. 3, the MAC-e processing section 33c is provided with an Enhanced Transport Format Combination (E-TFC) selecting section 33c1 and an HARQ processing section 33c2.

The E-TFC selecting section 33c1 is configured to determine a transmission format (E-TFC) of the E-DPDCH and a transmission format (E-TFC) of the E-DPCCH, based on scheduling signals transmitted from the radio base station Node B.

In addition, the E-TFC selecting section 33c1 is configured to transmit transmission format information on the determined transmission format (a transmission data block size, a transmission power ratio between the E-DPDCH and the DPCCH, or the like) to the layer-1 processing section 33d, and to transmit the determined transmission format information to the HARQ processing section 33c2.

The scheduling signals are information informed in the cell which the mobile station UE is located in. The scheduling signals include control information for all of the mobile stations that are located in the cell, or for mobile stations in a certain group that are located in the cell.

Furthermore, the E-TFC selecting section 33c1 is configured to control a transmission rate in an uplink during a soft handover by using a first relative rate control channel received from a serving cell and a second relative rate control channel received from a non-serving cell.

The HARQ processing section 33c2 is configured to perform process control for the "stop-and-wait of N-process", so as to transmit the user data in the uplink, based on a transmission acknowledgement signal (Ack/Nack for uplink data) transmitted from the radio base station Node B.

Specifically, the HARQ processing section 33c2 is configured to determine, based on a CRC result inputted from the layer 1 processing section 33d, whether or not the receive processing of downlink user data has been successful. Then, the HARQ processing section 33c2 is configured to generate a transmission acknowledgement signal (Ack or Nack for downlink user data) based on the determination result, so as to transmit the generated transmission acknowledgement signal to the layer 1 processing section 33d.

In addition, the HARQ processing section 33c2 is configured to transmits the downlink user data inputted from the layer 1 processing section 33d to the MAC-d processing section 33b, when the above-mentioned determination result has been "OK".

Figure 4:
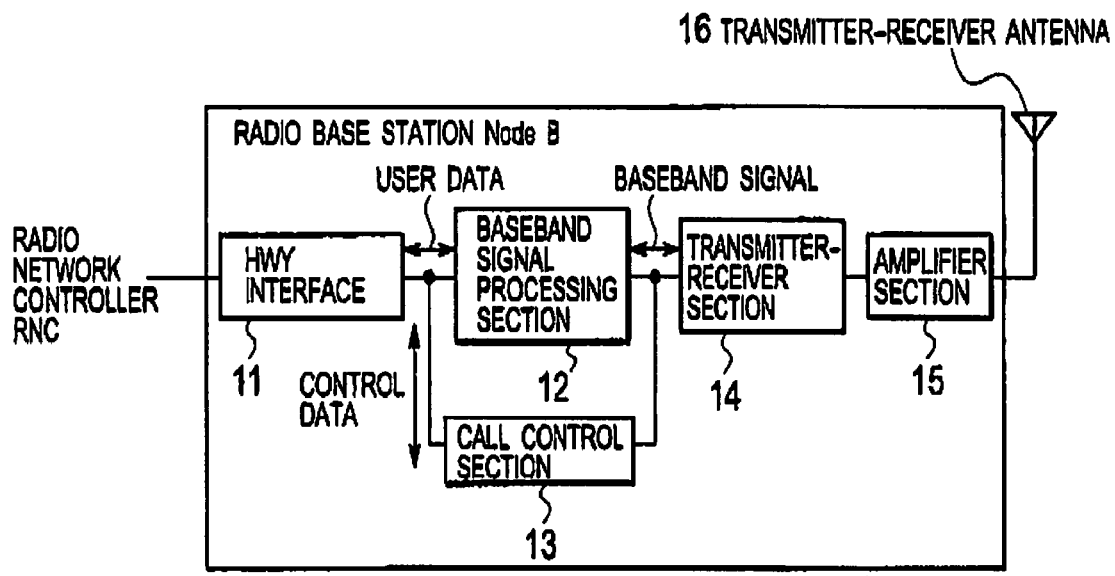
FIG. 4 shows a block diagram of radio base station Node B with an HWY interface 11, a baseband signal processing section 12, a call control section 13, at least one transmitter-receiver section 14, at least one amplifier section 15, and at least one transmission-reception antenna 16.

As shown in FIG. 4, the radio base station Node B according to this embodiment is provided with an HWY interface 11, a baseband signal processing section 12, a call control section 13, at least one transmitter-receiver section 14, at least one amplifier section 15, and at least one transmission-reception antenna 16.

The HWY interface 11 is an interface with a radio network controller RNC. Specifically, the HWY interface 11 is configured to receive user data transmitted from the radio network controller RNC to a mobile station US through a downlink, so as to input the user data to the baseband signal processing section 12. In addition, the HWY interface 11 is configured to receive control data for the radio base station Node B from the radio network controller RNC, so as to input the received control data to the call control section 13.

In addition, the HWY interface 11 is configured to acquire, from the baseband signal processing section 12, user data included in the uplink signals which are received from a mobile station UE through an uplink, so as to transmit the acquired user data to the radio network controller RNC. Further, the HWY interface 11 is configured to acquire control data for the radio network controller RNC from the call control section 13, so as to transmit the acquired control data to the radio network controller RNC.

The baseband signal processing section 12 is configured to generate baseband signals by performing the MAC-e processing and the layer-1 processing against the user data acquired from the HWY interface 11, so as to forward the generated baseband signals to the transmitter-receiver section 14.

Here, the MAC processing in the downlink includes an HARQ processing, a scheduling processing, a transmission rate control processing, or the like. In addition, the layer-1 processing in the downlink includes a channel coding processing of user data, a spreading processing, or the like.

In addition, the baseband signal processing section 12 is configured to extract user data by performing the layer-1 processing and the MAC-e processing against the baseband signals acquired from the transmitter-receiver section 14, so as to forward the extracted user data to the HWY interface 11.

Here, the MAC-e processing in the uplink includes an HARQ processing, a scheduling processing, a transmission rate control processing, a header disposal processing, or the like. In addition, the layer-1 processing in the uplink includes a despreading processing, a RAKE combining processing, an error correction decode processing, or the like.

Detailed description of the functions of the baseband signal processing section 12 will be given later. In addition, the call control section 13 is configured to perform the call control processing based on the control data acquired from the HWY interface 11.

The transmitter-receiver section 14 is configured to perform processing of converting baseband signals acquired from the baseband signal processing section 12, into radio frequency signals (downlink signals), so as to transmit the converted radio frequency signals to the amplifier section 15. In addition, the transmitter-receiver 14 is configured to perform processing of converting the radio frequency signals (uplink signals) acquired from the amplifier section 15, into the baseband signals, so as to transmit the converted baseband signals to the baseband signal processing section 12.

The amplifier section 15 is configured to amplify the downlink signals acquired from the transmitter-receiver section 14, so as to transmit the amplified downlink signals to the mobile station UE through the transmission-reception antenna 16. In addition, the amplifier 15 is configured to amplify the uplink signals received by the transmission-reception antenna 16, so as to transmit the amplified uplink signals to the transmitter-receiver section 14.

Figure 5:
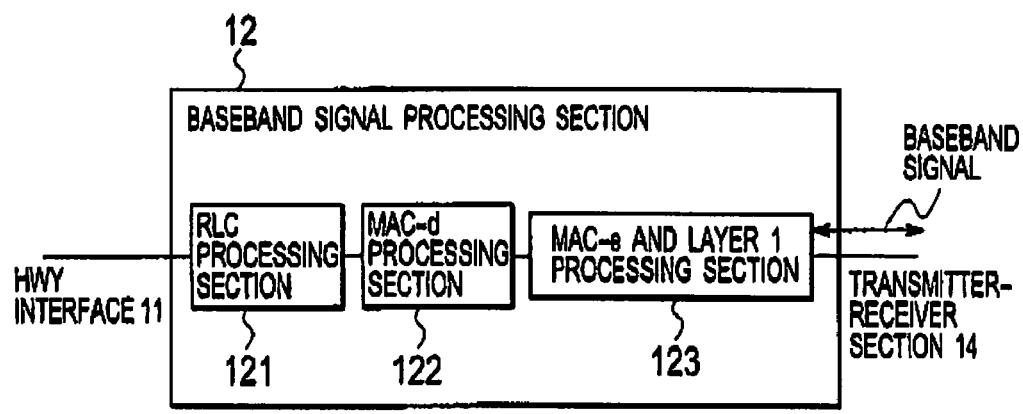
FIG. 5 is a functional block diagram of a radio base station of the mobile communication system according to the first embodiment of the present invention.

As shown in FIG. 5, the baseband signal processing section 12 is provided with an RLC processing section 121, a MAC-d processing section 122 and a MAC-e and layer-1 processing section 123.

The MAC-e and layer-1 processing section 123 is configured to perform, against the baseband signals acquired from the transmitter-receiver section 14, a despreading processing, a RAKE combining processing, an error correction decode processing, an HARQ processing, or the like.

The MAC-d processing section 122 is configured to perform such as a header discard processing or the like, against output signals from the MAC-e and layer-1 processing section 123.

The RLC processing section 121 is configured to perform such as a retransmission control processing in the RLC layer, a reconstruction processing in an RLC-SDU or the like, against the output signals from the MAC-d processing section 122.

However, these functions are not clearly divided per hardware, and can be acquired by software.

Figure 6:
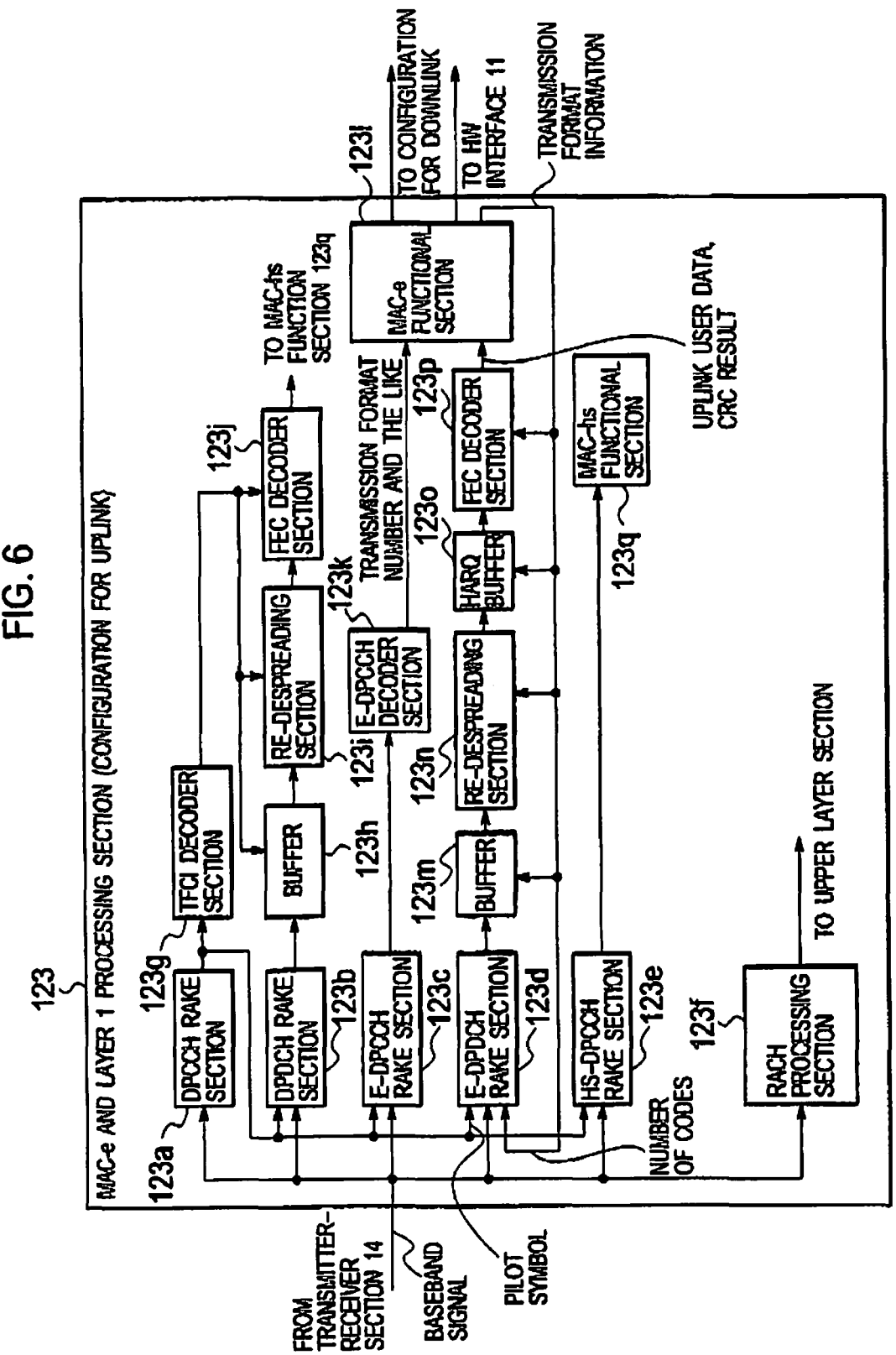
FIG. 6 is a functional block diagram of a baseband signal processing section in a radio base station of the mobile communication system according to the first embodiment of the present invention.

As shown in FIG. 6, the MAC-e and layer-1 processing section (configuration for the uplink) 123 is provided with a DPCCH RAKE section 123a, a DPDCH RAKE section 123b, an E-DPCCH RAKE section 123c, an E-DPDCH RAKE section 123d, an HS-DPCCH RAKE section 123e, a Transport Format Combination indicator (TFCI) decoder section 123g, buffers 123h and 123m, re-despreading sections 123i and 123n, FEC decoder sections 123j and 123p, an E-DPCCH decoder section 123k, a MAC-e functional section 123l, an HARQ buffer 123o, a MAC-hs functional section 123q.

The E-DPCCH RAKE section 123c is configured to perform, against the E-DPCCH in the baseband signals transmitted from the transmitter-receiver section 14, the despreading processing and the RAKE combining processing using a pilot symbol included in the DPCCH.

The E-DPCCH decoder section 123k is configured to acquire transmission format number related information, HARQ related information, scheduling related information, or the like, by performing the decode processing against the RAKE combining outputs of the E-DPCCH RAKE section 123c, so as to input the acquired information to the MAC-e functional section 123l.

The E-DPDCH RAKE section 123d is configured to perform, against the E-DPDCH in the baseband signals transmitted from the transmitter-receiver section 14, a despreading processing using the transmission format information (the number of codes) transmitted from the MAC-e functional section 123l and the RAKE combining processing using the pilot symbol included in the DPCCH.

The buffer 123m is configured to store the RAKE combining outputs of the E-DPDCH RAKE section 123d based on the transmission format information (the number of symbols) transmitted from the MAC-e functional section 123l.

The re-despreading section 123n is configured to perform a despreading processing against the RAKE combining outputs of the E-DPDCH RAKE section 123d stored in the buffer 123m, based on the transmission format information (a spreading factor) transmitted from the MAC-e functional section 123l.

The HARQ buffer 123o is configured to store the despreading processing outputs of the re-despreading section 123n, based on the transmission format information transmitted from the MAC-e functional section 123l.

The PEC decoder section 123p is configured to perform an error correction decoding processing (the FEC decoding processing) against the despreading processing outputs of the re-despreading section 123n, which is stored in the HARQ buffer 123o, based on the transmission format information (transmission data block sizes transmitted from the MAC-e functional section 123l.

The MAC-e functional section 123l is configured to calculate and output the transmission format information (the number of codes, the number of symbols, the spreading factor, the transmission data block size, and the like) based on the transmission format number related information, the HARQ related information, the scheduling related information, and the like, which are acquired from the E-DPCCH decoder section 123k.

Figure 7:
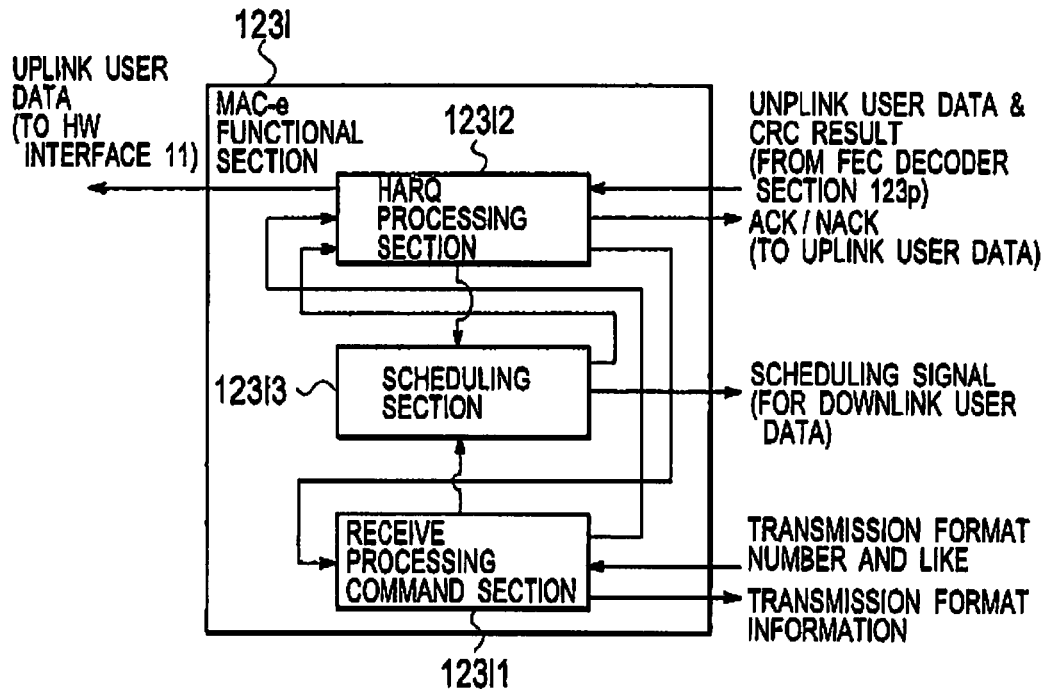
FIG. 7 is a functional block diagram of a MAC-e and layer-1 processing section (configuration for uplink), of the baseband signal processing section in a radio base station of the mobile communication system according to the first embodiment of the present invention.

In addition, as shown in FIG. 7, the MAC-e functional section 123l is provided with a receive processing command section 123l/1, an HARQ control section 123l/2, and a scheduling section 123l/3.

The receive processing command section 123l/1 is configured to transmit the transmission format number related information, the HARQ related information, and the scheduling related information, which are inputted from the E-DPCCH decoder section 123k, to the HARQ control section 123l/2.

In addition, the receive processing command section 123l/1 is configured to transmit, to the scheduling section 123l/3, the scheduling related information inputted from the E-DPCCH decoder 123k.

Further, the receive processing command section 123l/1 is configured to output the transmission format information corresponding to the transmission format number inputted from the E-DPCCH decoder section 123k.

The HARQ control section 123l/2 is configured to determine whether or not the receive processing of uplink user data has been successful, based on the CRC result inputted from the FEC decoder section 123p.

Then, the HARQ control section 123l/2 is configured to generate a transmission acknowledgement signal (Ack or Nack), based on the determination result, so as to transmit the generated transmission acknowledgement signals to the configuration for the downlink of the baseband signal processing section 12.

In addition, the HARQ control section 123l/2 is configured to transmit the uplink user data inputted from the FEC decoder section 123p to the radio network controller RNC, when the above determination result has been "OK".

In addition, the HARQ control section 123l/2 is configured to clear soft decision information stored in the HARQ buffer 123o when the above determination result is "OK".

On the other hand, when the above determination result is "NG", the HARQ control section 123l/2 is configured to store the uplink user data in the HARQ buffer 123o, the uplink user data.

In addition, the HARQ control section 123l/2 is configured to forward the above determination result to the receive processing command section 123l/1. The receive processing control command section 123l/1 is configured to notify the E-DPDCH RAKE section 123d and the buffer 123m of an hardware resource to be prepared for the following transmission time interval (TTI), so as to perform notification for reserving the resource in the HARQ buffer 123o.

In addition, the receive processing command section 123/1 is configured to concatenate the uplink user data for a process allocated to the TTI, which is stored in the HARQ buffer 123$o$, and a newly received uplink user data, when the newly received uplink user data is stored in the buffer 123$m$. Then, the receive processing command section 123/1 is configured to instruct the HARQ buffer 123$o$ and the FEC decoder section 123$p$ to perform the FEC decoding processing per TTI.

The scheduling section 123/3 is configured to transmit scheduling signals (an absolute rate control channel (AGCH), a relative rate control channel (RGCH)) via the configuration for downlink.

Specifically, the scheduling section 123/3 is configured to transmit a first relative rate control channel (RGCH) for controlling a transmission rate of uplink user data of a serving mobile station, and to transmit a second relative rate control channel (RGCH) for controlling a transmission rate of uplink user data of a non-serving mobile station.

Here, the scheduling section 123/3 is configured to set the maximum frequency of transmitting a relative rate control channel (RGCH) including a "Down" command to a value fixed in the mobile communication system or to a value notified by the radio network controller RNC, when the radio base station Node B operates as a non-serving cell.

Moreover, in the radio base station Node B, the maximum frequency may be set by an O&M (Operation & Maintenance) terminal for the radio base station Node B, or by a vendor when the radio base station Node B is produced.

Alternatively, the maximum frequency may be set according to the number of TTIs, or according to a time.

The radio network controller RNC according to the present embodiment is an apparatus located on upper level of the radio base station Node B and configured to control radio communication between the radio base station Node B and the mobile station UE.

Figure 8:
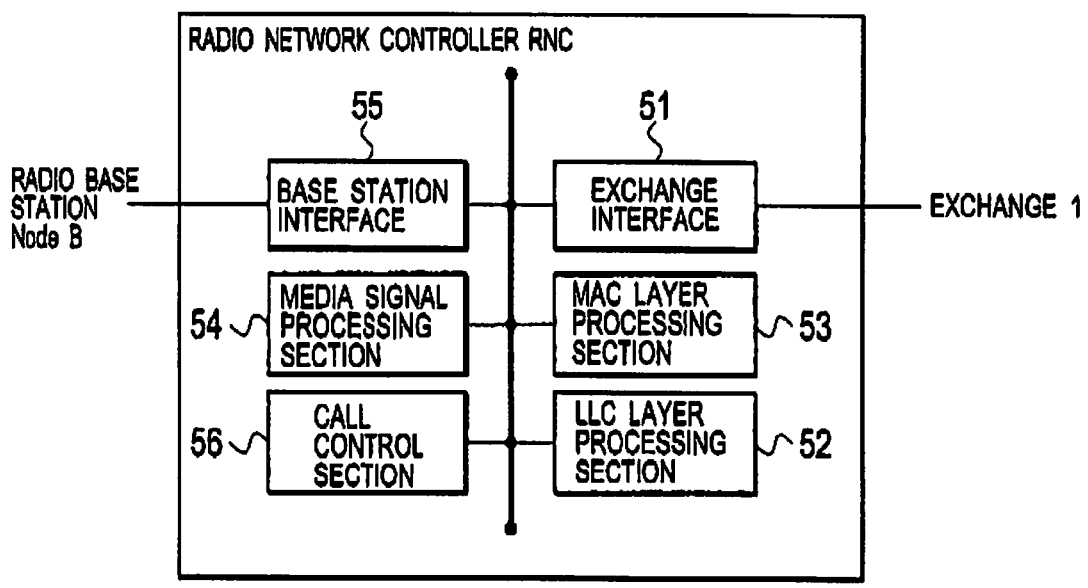
FIG. 8 is a functional block diagram of a radio network controller of the mobile communication system according to the first embodiment of the present invention.

As shown in FIG. 8, the radio network controller RNC according to this embodiment is provided with an exchange interface 51, a Logical Link Control (LLC) layer processing section 52, a MAC layer processing section 53, a media signal processing section 54, a radio base station interface 55 and a call control section 56.

The exchange interface 51 is an interface with an exchange 1. The exchange interface 51 is configured to forward the downlink signals transmitted from the exchange 1 to the LLC layer processing section 52, and to forward the uplink signals transmitted from the LLC layer processing section 52 to the exchange 1.

The LLC layer processing section 52 is configured to perform an LLC (Logical Link Control) sub-layer processing such as a synthesis processing of a header (e.g. a sequence number) a trailer, or the like.

The LLC layer processing section 52 is also configured to transmit the uplink signals to the exchange interface 51 and to transmit the downlink signals to the MAC layer processing section 53, after the LLC sub-layer processing is performed.

The MAC layer processing section 53 is configured to perform a MAC layer processing such as a priority control processing or a header granting processing.

The MAC layer processing section 53 is also configured to transmit the uplink signals to the LLC layer processing section 52 and to transmit the downlink signals to the radio base station interface 55 (or a media signal processing section 54), after the MAC layer processing is performed.

The media signal processing section 54 is configured to perform a media signal processing against voice signals or real time image signals.

The media signal processing section 54 is also configured to transmit the uplink signals to the MAC layer processing section 53 and to transmit the downlink signals to the radio base station interface 55, after the media signal processing is performed.

The radio base station interface 55 is an interface with the radio base station Node B. The radio base station interface 55 is configured to forward the uplink signals transmitted from the radio base station Node B to the MAC layer processing section 53 (or the media signal processing section 54) and to forward the downlink signals transmitted from the MAC layer processing section 53 (or the media signal processing section 54) to the radio base station Node B.

The call control section 56 is configured to perform a radio resource control processing, a channel setup and open processing by the layer-3 signaling, or the like. Here, the radio resource control processing includes a call admission control processing, a handover processing, or the like.

The call controller 56 is configured to notify the maximum frequency with which the non-serving cell transmits a relative rate control channel (RGCH) including a "Down" command.

Figure 9:
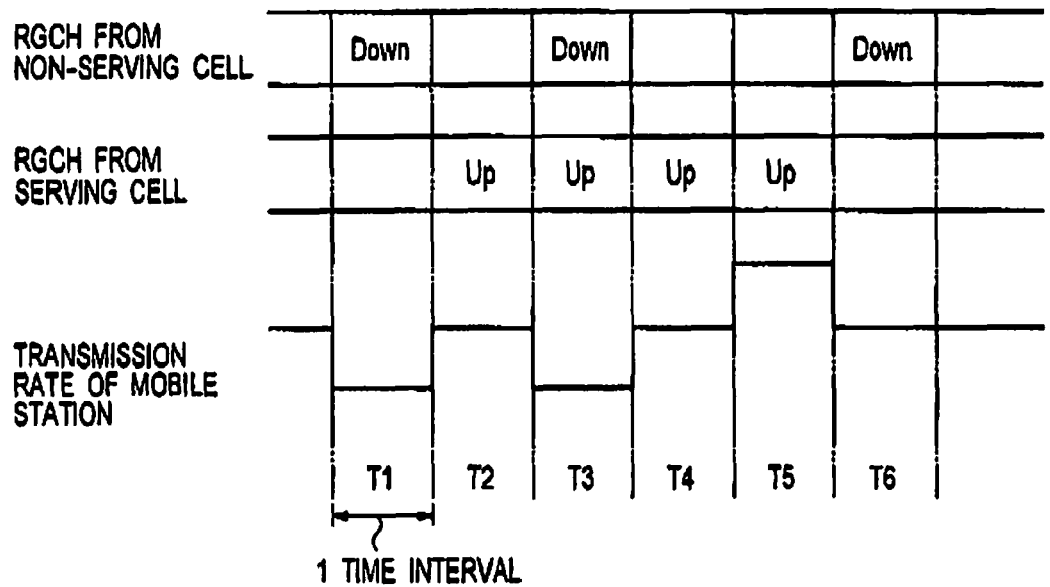
FIG. 9 is a diagram for explaining a transmission of a relative transmission rate control channel in the mobile communication system according to the first embodiment of the present invention.

With reference to FIG. 9, the operation of the mobile communication system according to the first embodiment of the present invention will be described. FIG. 9 is a diagram showing a relative rate control channel (RGCH) transmitted by a non-serving cell, a relative rate control channel (RGCH) transmitted by a serving cell, and transition of a transmission rate in the uplink of the mobile station UE.

In the example of FIG. 9, the maximum frequency with which the non-serving cell transmits a relative rate control channel (RGCH) including a "Down" command is once in two time intervals. Specifically, the maximum frequency is determined by the system, or designated by the radio network controller RNC, so that the relative rate control channel (RGCH) including the "Down" command is not transmitted in two consecutive time intervals.

As shown in FIG. 9, since the non-serving cell is not allowed to consecutively transmit a relative transmission rate control channel (RGCH) including a "Down" command, the transmission rate in the uplink can be maintained by the "Up" commands designated by the serving cell (for example, in T2, T4 and T5).

In addition, the minimum transmission rate and the like vary according to the QoS of the mobile station in the serving cell. Therefore, it is possible to contribute to the reduction of the interference power of the non-serving cell, by making a mobile station with not strict QoS to follow the "Down" command from a non-serving cell and by making a serving cell not to transmit a relative transmission rate control channel (RGCH) including an "Up" command to the mobile station with not strict QoS.

It should be noted that the present invention is not limited to the above-described embodiment, and various modifications are possible.

INDUSTRIAL APPLICABILITY

As has been explained, the present invention can provide a transmission rate control method and a mobile station that make it possible to minimize deterioration in the service quality, due to "Down" commands from non-serving cells. This can be achieved by preventing consecutive transmission of a relative transmission rate control channel (RGCH) including a "Down" command, and thereby, by creating a time interval for allowing the "Up" command included in the relative transmission rate control channel (RGCH) transmitted from the serving cell to be effective.

The invention claimed is:

1. A transmission rate control method comprising:
controlling, at a mobile station, a transmission rate of uplink user data by using a first relative transmission rate control channel received from a serving cell and a second relative transmission rate control channel received from a non-serving cell,
wherein a maximum frequency of transmitting the second relative transmission rate control channel which includes a down command for instructing to decrease the transmission rate of the uplink user data is a value fixed in a mobile communication system.

2. A transmission rate control method comprising:
controlling, at a mobile station, a transmission rate of uplink user data by using a first relative transmission rate control channel received from a serving cell and a second relative transmission rate control channel received from a non-serving cell,
wherein a maximum frequency of transmitting the second relative transmission rate control channel which includes a down command for instructing to decrease the transmission rate of the uplink user data is a value notified by a radio network controller.

3. A radio base station configured to transmit a first relative transmission rate control channel for controlling a transmission rate of uplink user data of a serving mobile station, and to transmit a second relative transmission rate control channel for controlling a transmission rate of uplink user data of a non-serving mobile station, wherein
a maximum frequency of transmitting the second relative transmission rate control channel which includes a down command for instructing to decrease the transmission rate of the uplink user data of the non-serving mobile station is set in the radio base station.

* * * * *